United States Patent [19]
Ramesh

[11] Patent Number: 6,131,180
[45] Date of Patent: Oct. 10, 2000

[54] TRELLIS CODED MODULATION SYSTEM

[75] Inventor: Rajaram Ramesh, Cary, N.C.

[73] Assignee: Ericsson, Inc., Research Triangle Park, N.C.

[21] Appl. No.: 08/963,482

[22] Filed: Nov. 3, 1997

[51] Int. Cl.⁷ .............................................. H03M 13/03
[52] U.S. Cl. .............................................. 714/790
[58] Field of Search ................................. 714/793, 790, 714/792, 786, 755, 795; 375/341, 262, 265

[56] References Cited

U.S. PATENT DOCUMENTS

| | | | |
|---|---|---|---|
| 4,581,601 | 4/1986 | Calderbank et al. | 340/347 |
| 4,788,694 | 11/1988 | Calderbank | 375/59 |
| 5,159,610 | 10/1992 | Eyuboglu et al. | 375/18 |
| 5,394,439 | 2/1995 | Hemmati | 375/242 |
| 5,461,632 | 10/1995 | Lomp et al. | 714/786 |
| 5,621,761 | 4/1997 | Heegard | 375/265 |
| 5,657,333 | 8/1997 | Ikekawa | 714/755 |
| 5,812,601 | 9/1998 | Schramm | 714/795 |
| 5,844,922 | 12/1998 | Wolf et al. | 714/786 |
| 5,862,155 | 1/1999 | Lomp et al. | 714/791 |

OTHER PUBLICATIONS

Chan et al., Performance of Punctured Trellis Coded Modulation Over Fading Channels, IEEE, p. 339 to 343, May 7, 1997.

Rate Compatible Punctured Convolutional Codes (rpcpc codes) and their Applications ,Joachim Hagenauer,IEEE p389–400, Apr. 4, 1988.

Fang, R.J.F. "A Coded 8–PSK System for 140–Mbit/s Information Rate Transmission Over 80–MHz Nonlinear Transponders", 7$^{th}$ Int'l Conference on Satellite Communications, May 12–16 1986, pp. 305–314, XP–002093827.

Bertelsmeier, Manfred, "Modified coded Octal Phas–Shift Keying With Improved Carrier–Phase Tracking Ability", IEEE Global Telecommunications Conference, Dec. 1–4, 1986, pp. 1356–1360, vol. 3, XP–002093828.

Mao, Tom R., "Hybrid Trellis–Coded CPFSK Signalling", IEEE Singapore Int'l Conference on Networks/Int'l Conference on Information Engineering, Jul. 3–7, 1995, pp. 309–312, XP–002093829.

Li Hui; Noll, Peter; "Comparative Study of Two Rate–Selective Coding Techniques", Vortage Der Itg–Fachtagung 130, Jan. 26, 1994–Oct. 28, 1994, pp. 177–183, CP–000503792.

Nakajima, Shigeo; "Adaptive Coding Rate Trellis–Coded 8PSK System", IEICE Transactions on Fundamentals of Electronics, Communications and Computer Sciences, vol. E80–A, No. 7, Jul. 1997, pp. 1190–1195, XP–000748950.

Sundberg, Carl–Erik; Hagenauer, Joachim; "Hybrid Trellis––Coded 8/4–PSK Modulation Systems", IEEE Transactions on Communications, vol. 38, No. 5, May 1990, pp. 602–613, XP–000136883.

*Primary Examiner*—Albert De Cady
*Assistant Examiner*—Shelly A Chase
*Attorney, Agent, or Firm*—Coats & Bennett, P.L.L.C.

[57] ABSTRACT

A time-varying trellis code is used to obtain a desired effective code rate which produces an encoder output directly mappable onto a signal constellation. The time-varying trellis code is obtained by using a variable rate encoder which produces, at its output, the correct number of bits to map directly onto the desired signal constellation. The input data stream is coded at a first code rate during a first selected time interval, and at a second code rate during a second selected time interval. By varying the code rate at periodic intervals, a third effective code rate is obtained.

6 Claims, 9 Drawing Sheets

TRELLIS CODED MODULATION SYSTEM

FIELD OF THE INVENTION

The present invention relates generally to a method for data transmission employing trellis coded modulation, and, more particularly, to a coded modulation scheme implementing time-varying trellis codes.

BACKGROUND OF THE INVENTION

Trellis coded modulation is a technique for combining coding and modulation to increase channel capacity and improve bit error performance. This coded modulation scheme is based on the concept of mapping by set partitioning described by Ungerboeck in the seminal paper *Channel Coding With MultilevellPhase Signals, IEEE Transactions on Information Theory*, VoL IT-28, No. 1, January 1982. Trellis coded modulation (TCM) combines coding and modulation operations, thus allowing for improved reliability of the communications system without increasing power or bandwidth requirements. More specifically, the TCM technique combines a higher-order modulation scheme with a convolution type encoding scheme at the transmission end of the system, while the receiving end of the system, instead of performing demodulation and decoding in two separate steps, combines the two operations into one.

A typical TCM scheme involves the mapping of an encoder output directly to a point on a signal constellation, such as an 8-PSK constellation. The combination of the encoding and mapping elements is jointly optimized so as to obtain good error performance. For example, an encoder could take two bits as input and have a three-bit output which is mapped to an 8-PSK constellation. In such a case, the encoder would be said to encode at a 2/3 rate, that is, two inputs bits produce three encoded output bits. Since each point in the signal constellation may have one of two possible values in a binary system, it is necessary to have the number of encoded output bits equal to the logarithm base 2 of the number of points in the desired signal constellation. Thus, when an eight point constellation is used, there should be three encoded output bits (i.e. $2^3=8$ points). When the trellis code is received and decoded by the system receiver, each branch of the trellis corresponds to one 8-PSK symbol, which facilitates soft decision decoding.

Implementing rates such as 3/4 using an 8-PSK constellation presents a problem, however. It is desired that the encoded output be mapped to a single signal in the signal constellation. There is no obvious way to map the 4-bit encoded output of a rate 3/4 encoder to an 8-PSK symbol so that there is only one 8-PSK symbol per trellis branch. Using the logarithm base 2 rule discussed above, a 3/4 rate encoder would require at least a 16 point signal constellation. As higher-order signal constellations ultimately require more bandwidth and power resources, there is a need for a practical method of efficiently using smaller signal constellations to modulate encoded output bit streams produced in TCM applications.

SUMMARY OF THE INVENTION

The present invention provides a trellis coded modulation scheme which allows the encoder output to be mapped directly to a signal constellation previously thought to be incompatible. For example, using the present invention, the output of a 3/4 rate encoder can be mapped directly onto an 8 point signal constellation where in the past it was thought that a 16 point constellation was needed. This result is accomplished by use of a time-varying trellis code.

A time-varying trellis code is obtained by using a variable rate encoder which produces at its output the correct number of bits to map directly onto the desired signal constellation. By varying the coding rate of the encoder at periodic intervals of time, it is possible to obtain a large number of different coding rates. For example, the variable rate encoder could obtain coding rates of 2/3 and 3/3 at different time intervals. In this example, a rate 3/4 code can be obtained by coding the first 6 input bits at rate 2/3 and the final 3 input bits at rate 3/3 . The first 6 input bits represent three trellis stages and the final 3 input bits represent a fourth trellis stage. Over all four trellis stages, there are a total of 9 input bits and 12 output bits giving an effective rate of 3/4. However, only 3 output bits are generated at each stage which can be mapped directly onto an 8 point signal constellation One way to implement the coding method of the present invention is to switch an input data stream between two convolutional encoders having different coding rates. The convolutional encoders may be implemented using shift registers and combiners. Each encoder would include the same number of shift register cells. When the input is switched from one encoder to the other, the contents of the encoder used up to that point are shifted into the other encoder.

Another method of implementing the time-varying trellis code of the present invention is to puncture the output of a single convolutional encoder using two distinct puncture patterns. At pre-determined instants, the puncturing pattern is switched thereby realizing two different coding rates. By aggregating the trellis stages of the convolutional encoder together with different levels of aggregation, the resulting trellis time-varying. For example, if the trellis is of the convolutional encoder has two branches per state, the first puncturing pattern could be over two trellis stages, and the second puncturing pattern could be over three trellis stages. Aggregating two and three trellis stages, we get a time-varying trellis with four branches and eight branches respectively.

A third method of implementing the time-varying trellis code of the present invention is to store multiple encoders as a look-up table in a memory device. Each encoder has two look-up tables, one containing information on the state transitions occurring during each input symbol for a particular, current state of the encoder, and another table containing information on the output of the encoder given a particular state transition. For each input symbol, the encoder updates its state and emits an output. At pre-determined instants of time, the look-up tables are switched and the grouping of inputs bits is changed to implement the time-varying trellis.

DETAILED DESCRIPTION OF THE INVENTION

Figure 1:
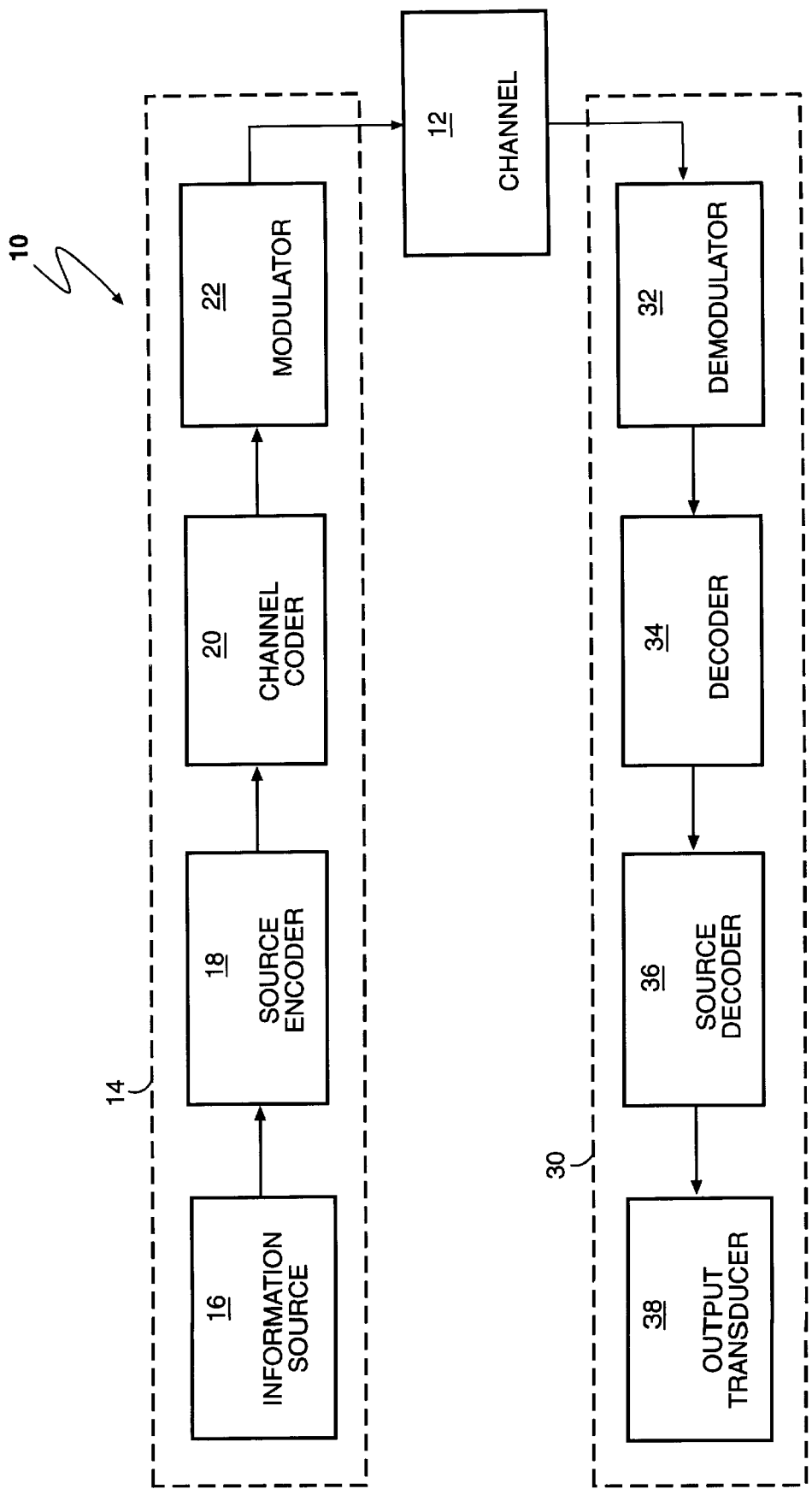
FIG. 1 is a block diagram of a digital communication system.

FIG. 1 illustrates a digital communications system, generally indicated by the numeral 10, employing a trellis coded modulation scheme. The system 10 consists generally of a transmitter 14 and a receiver 30 which are coupled by a communications channel 12. The transmitter 14 includes an information source 16, a source encoder 18, a channel coder 20 and a modulator 22. The information source 16 provides the source data stream that is to be ultimately conveyed to the receiver 30. This source data is assumed to be in a digitized format and is passed directly to the source encoder 18. The source encoder 18 removes redundancy or randomizes the source data stream, producing an information sequence which has been optimized for maximum information content. The information sequence from the source encoder 18 is passed to the channel coder 20.

The channel encoder 20 is designed so as to introduce an element of redundancy into the information sequence which is supplied by the source encoder 18 to generate a coded output. While initially appearing at odds with the function of the source encoder 18 previously discussed, in reality the redundancy added by the channel coder 20 serves to enhance the error correction capability of the communication system. By introducing redundant information into the information sequence in a controlled manner, a receiver having knowledge of the codes used can detect and possibly correct errors which may occur during transmission by making use of the redundant information.

The modulator 22 interfaces the channel coder 20 to the communications channel 12. That is, the modulator 22 receives coded output from the channel coder 20 and generates waveforms that both suit the physical nature of the channel 12 and can be efficiently transmitted over the channel 12. The term "signal constellation" is often used to refer to the set of possible signal waveforms available for mapping of the coded output of the channel coder 20. These output waveforms, or signal constellation schemes, are generally selected with regard to either simplification of the communication system, optimal detection performance, power requirements, or bandwidth availability. Typical signal constellations used in digital communications system modulation include 16 QAM, 8-PSK, 4-PSK and the like.

At the receiver 30 of the digital communications system 10 a demodulator 32 processes the output waveform (which is corrupted by the channel 12 during transmission) at any given time to determine which of the possible signals in the signal constellation was transmitted. For example, when binary modulation is used, the demodulator 32 processes the received waveform and decides whether a transmitted bit is a 0 or 1. When the transmitted sequence includes redundancy introduced by channel coding, the output of the demodulator 32 is passed to a decoder 34 which attempts to reconstruct the original information sequence from it's a priori knowledge of the code used by the channel coder 16. A measure of how well the demodulator 32 and decoder 34 perform is the frequency with which errors occur in the decoded sequence. As a final step, when an analog output is desired, a source decoder 36 accepts the output sequence from the decoder 34, and from knowledge of the source encoding method, attempts to reconstruct the original signal from the source 14. The difference between the reconstructed signal and the original is a measure of the distortion introduced by the communication system.

Figure 2:
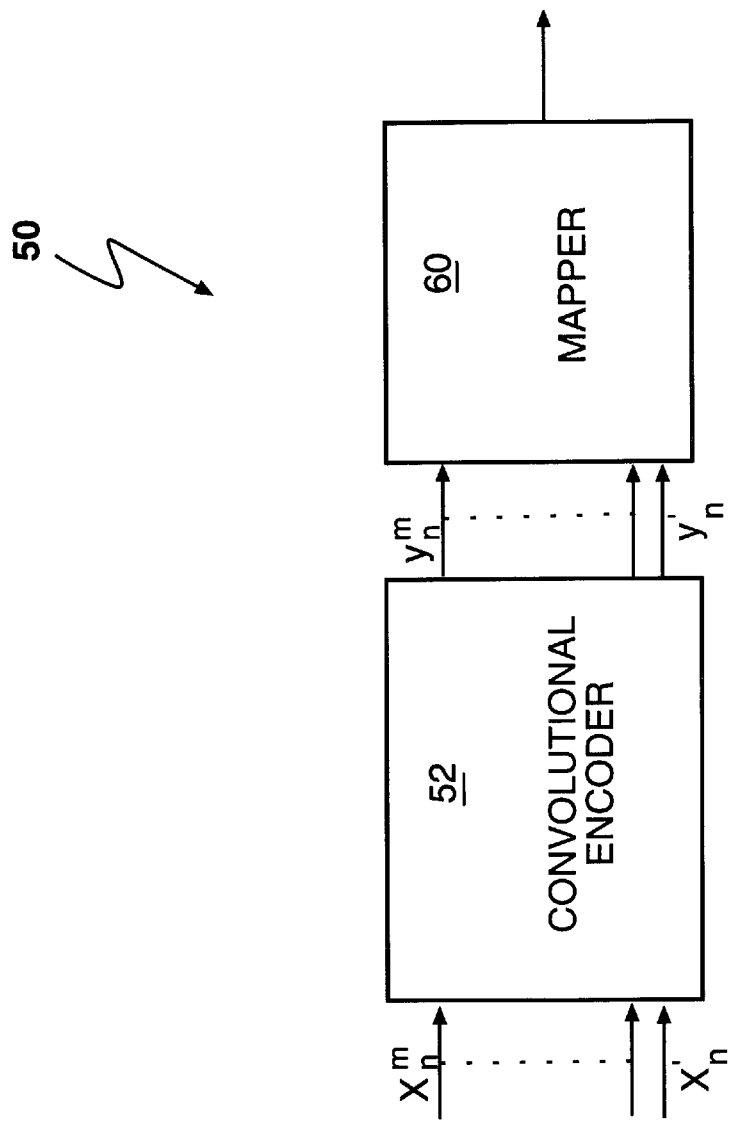
FIG. 2 is a block diagram showing the encoder structure for a trellis coded modulation system

Referring now to FIG. 2, the encoder structure for a trellis coded modulation system is shown and designated generally by the numeral 50. The trellis coder 50 comprises a convolutional encoder 52 and a signal mapper 60. The convolutional encoder 52 implements specific error control codes for formatting the data to be transmitted in such a manner so as to increase its immunity to noise. The convolutional encoder 52 receives the information sequence provided by the source encoder 16 and generates a coded output which possesses a high degree of noise immunity. This coded output is then passed to the signal mapper 60 which in turn maps the coded output bits to points in an appropriate signal constellation. The mapping scheme is chosen so that the Euclidean distance between transmitted sequences is maximized.

Figure 3:
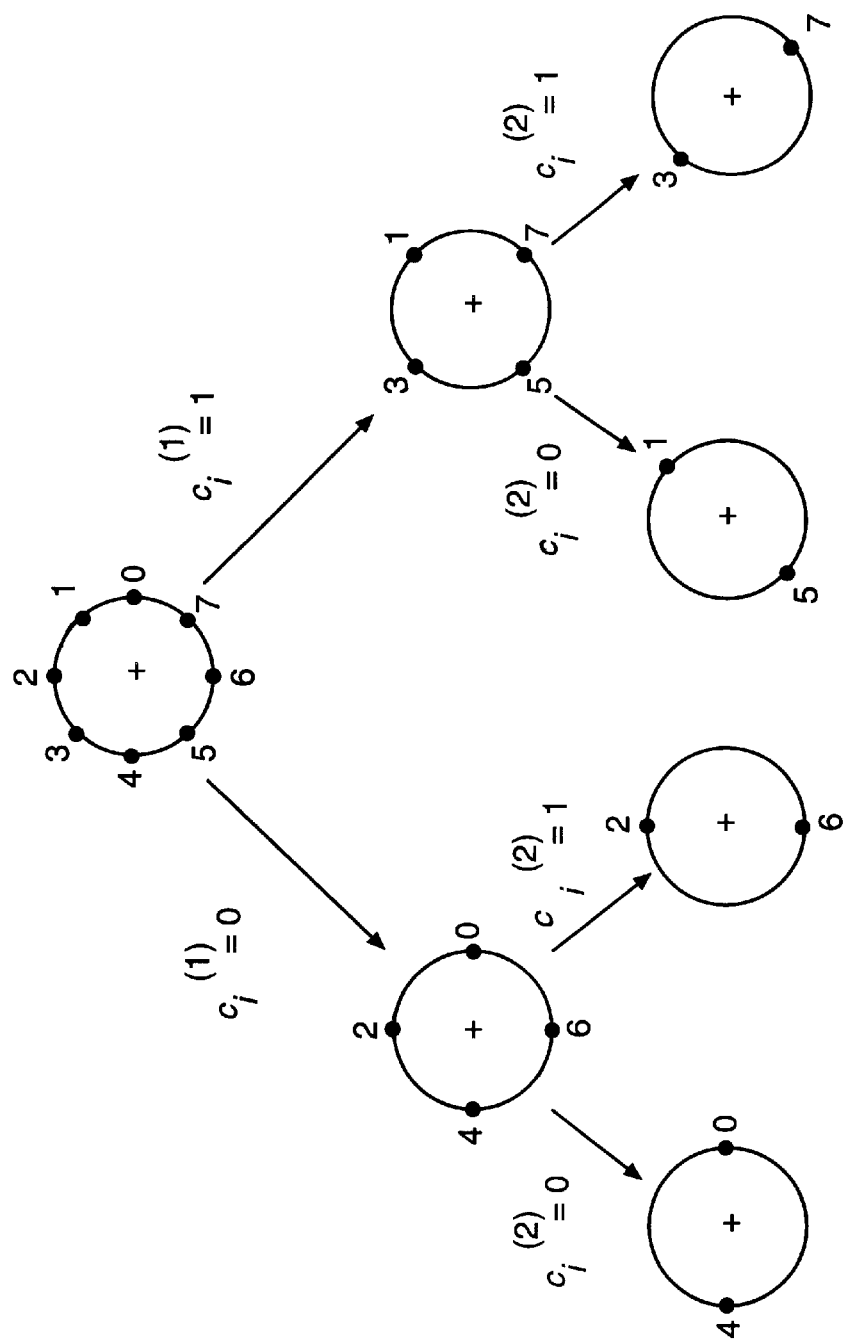
FIG. 3 is an illustration showing set partitioning for an 8-PSK modulation scheme.

A method that ensures improved Euclidean distance is mapping by set partitioning. In general, the signal constellation is partitioned into subsets such that the subsets are all similar and the points in each subset are maximally separated. FIG. 3 shows one example of partitioning an 8-PSK signal constellation. The signal mapper divides the coded output of the convolutional encoder into two groups of bits, $k_1$ and $k_2$. The $k_1$ bits are used to select a partition of the signal constellation, while the $k_2$ bits are used to select a point in the partition. Since the technique of mapping by set partitioning is well known to those skilled in the art and is not a critical aspect of the present invention, further description of the technique is omitted.

The method of the present invention involves an improvement of the trellis coded modulation system described above. Those skilled in the art will appreciate that the convolutional encoder 52 typically adds an element of controlled redundancy to the information sequence via the insertion of error control bits. Consequently, the number of coded output bits from the convolutional encoder 52 is greater than the number of bits in the information sequence. The coding rate is defined as the ratio of bits in the information sequence to the number of coded output bits. The number of coded output bits determines the size of the signal constellation required of the modulator or mapper.

In the past, it was necessary to select a code rate which produced the correct number of coded output bits which could be mapped directly onto a desired signal constellation. For example, if an 8 point signal constellation was desired, a code which produced 3 coded output bits was needed. If a code rate of 3/4 was desired, then a 16 point signal constellation was needed to enable direct mapping of the coded output to the signal constellation. Consequently, employing past techniques, there was no simple way of mapping a 4 bit coded output of a rate 3/4 encoder to an 8 point signal constellation if you want to optimize coding and mapping jointly.

The present invention solves this problem by utilizing a time-varying trellis code. The desired code rate is obtained by using a combination of encoders which are switched periodically. Each encoder has a code rate that produces the correct number of coded output bits to map directly onto a selected signal constellation. By alternating between encoders at different coding intervals, it is possible to achieve coding rates that otherwise would not be practical using the selected signal constellation.

For example, a rate 3/4 code can be implemented using the coding method of the present invention and mapped directly onto an 8-PSK signal constellation. To obtain the desired rate 3/4 code, a rate 2/3 encoder and a rate 3/3 encoder are employed at different intervals of time. Two input bits are presented to the rate 2/3 encoder during three consecutive coding intervals. Consequently, a total of six input bits are processed, resulting in the production of nine coded output bits. At the fourth coding interval, the next three input bits are provided to the rate 3/3 encoder, which produces three coded output bits. Thus, over all four coding intervals, there are a total of nine input bits and twelve coded output bits giving an effective rate of 3/4. Advantageously, at each coding interval, only three coded output bits were generated which can be mapped directly to the 8-PSK signal constellation.

Figure 4:
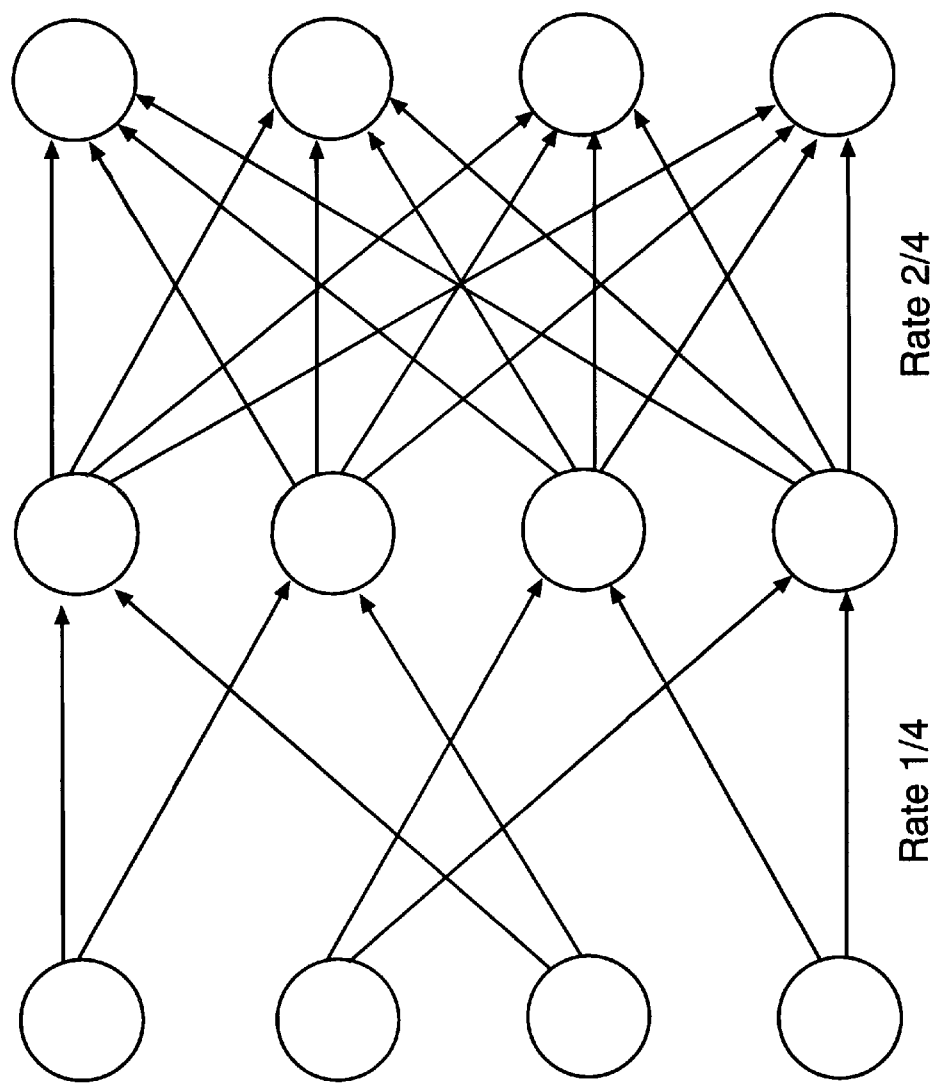
FIG. 4 is a drawing illustrating the trellis structure of a time-varying trellis code.

The coding method of the present invention results in a time-varying trellis code which is illustrated in FIG. 4. Referring to FIG. 4, a trellis structure is shown representing a time varying trellis code which alternates between a rate 1/4 code and a rate 2/4 code at every coding interval. Each column represents a coding interval or stage and each circle represents a particular state. The branches of the trellis structure represent transitions between states in two adjacent coding intervals. A path is a series of connected branches that extend through the trellis structure. When a rate 1/4 code is used, there are two branches per state in the trellis structure. When a rate 2/4 is used, there are four branches per state in the trellis structure. Every path through the trellis structure corresponds to a unique sequence of valid code words generated by the encoder.

There are a number of possible ways to implement the encoding method of the present invention. Three methods are described below and will be referred to as a multiple encoder method, a puncture method, and a look-up table method. In the multiple encoder method, the input data stream or information sequence is switched between multiple encoders having different coding rates. In the puncture method, different coding rates are realized by applying different puncture patterns to the output of a single encoder. In the look-up table method, the multiple encoders are implemented as a look-up tables in a memory device. A processor "looks-up" the appropriate output and state transition given the input and the current state.

Figure 5:
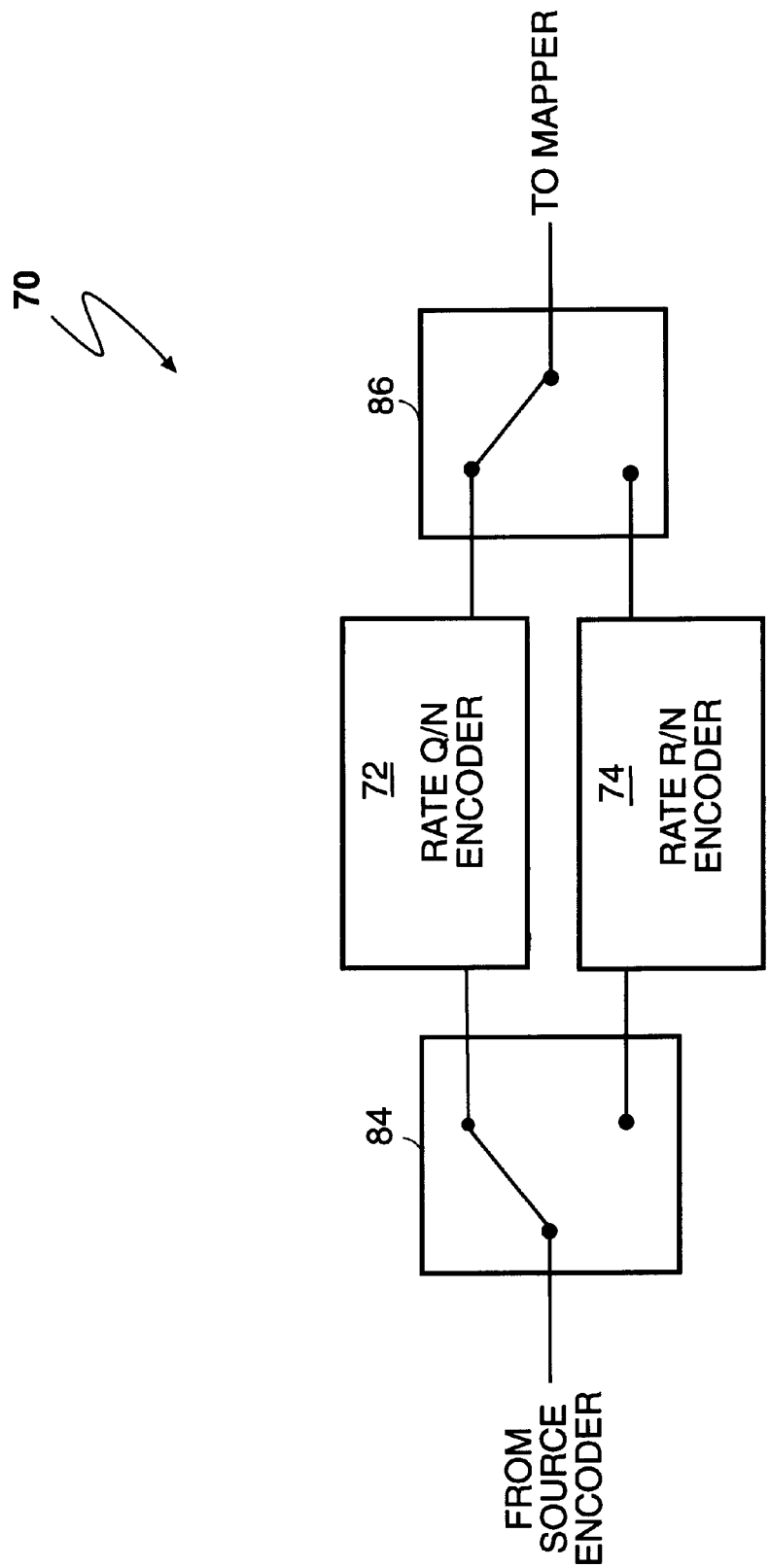
FIG. 5 is a conceptual block diagram of the encoder used in the present invention.
Figure 6A:
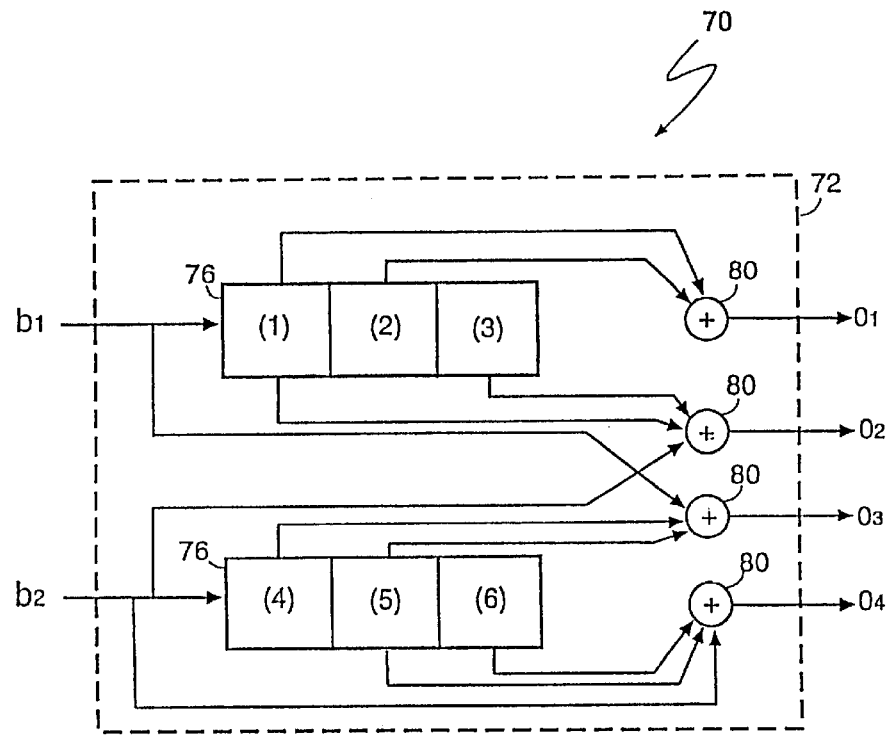
FIGS. 6a and 6b are block diagrams illustrating a pair of convolutional encoders that implement a shift register method of encoding.
Figure 6B:
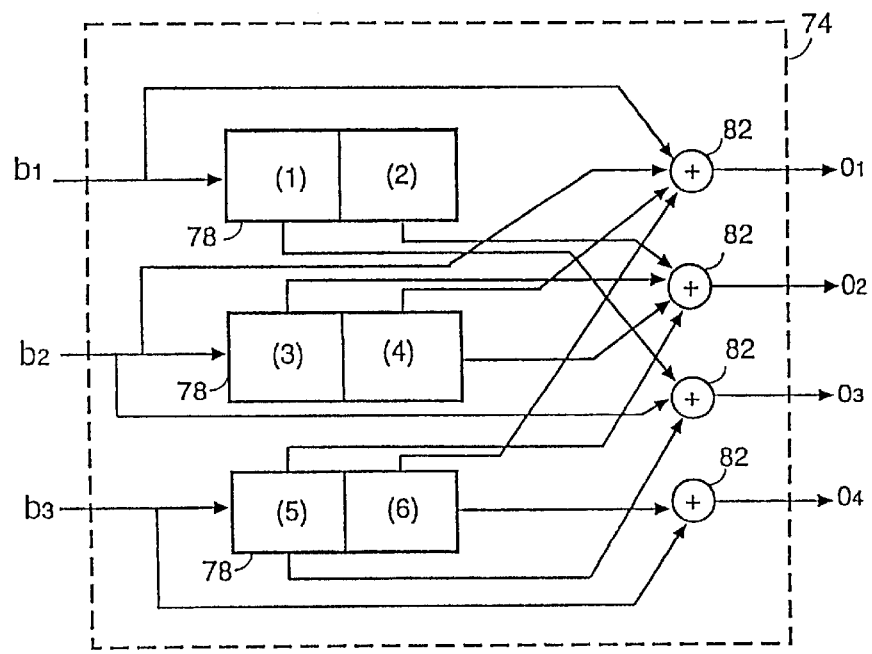

FIG. 5 illustrates the multiple encoder implementation of the enhanced trellis coded modulation scheme described above. In this case, a trellis coder 70 is comprised of a pair of encoders 72 and 74, an input controller 84, and an output controller 86. Encoders 72 and 74 are implemented in the form of shift registers 76, 78 and combinational nodes 80, 82 as shown in FIGS. 6a and 6b. Encoder 72 includes two shift registers 76 and four combinational nodes 80. The two shift registers 76 have a total of six delay cells. Encoder 72 receives two source encoded input bits and produces four convolutionally encoded output bits, thus establishing a coding rate of 2/4. Encoder 74 includes three shift registers 78 and four combinational nodes 82. The three shift registers 78 also have a total of six delay cells. However, encoder 74 is arranged to receive three source encoded input bits and produces four convolutionally encoded output bits, thus establishing an encoding rate of 3/4.

The elements of the shift registers 76, 78 are connected in a predetermined manner to respective combinational nodes 80, 82. Each node 80, 82 receives input from one or more delay cells of the shift register 76, 78 and, through the application of a combinational algorithm, produces a single output which may contain one or more bits. This processing of shift register contents is performed at each coding interval, for the active encoder 72, 74, thus producing the full complement of four encoded output bits.

As new input data bits are presented to the encoder 72, 74, the contents of each shift register 76, 78 are shifted one position to the right. For example, encoder 72 receives two input bits which are inserted into delay cells 1 and 4, while the previous contents of delay cells 1 and 4 are shifted right into delay cells 2 and 5, respectively. In a similar manner, the bits formerly occupying delay cells 2 and 5 are shifted right and assume positions in delay cells 3 and 6, respectively. When shifted to the right, the previous contents of the delay cells 3 and 6 are shifted out of and purged from the encoder 72. Encoder 74 operates in a similar manner, except that it receives 3 bits.

The encoders 72 and 74 function in a cooperative manner to produce overall effective coding rates that would not be obtainable by either of the encoders alone. This cooperative action is facilitated by the input and output controllers 84 and 86. In practice, these controllers 84 and 86 effectively activate a single, specific encoder 72, 74 by simultaneously connecting the selected encoder input terminals to the information sequence, and the selected encoder output terminals to the signal mapper 60. At the instant the controllers 84, 86 select a new encoder, the contents of the shift register associated with the previous encoder are transferred to corresponding shift register of the newly selected encoder. For example, assume encoder 72 was active for a certain interval of time, receiving two input bits and producing a four-bit output. In the next interval of time, the controllers 54 and 58 determine that encoder 74 is now to be activated, while encoder 72 will become deactivated. Consequently, the contents of delay cells 1 through 6 of encoder 72, which is deactivated, are transferred to the corresponding delay cells 1 through 6 of encoder 74, which is activated. The information sequence is then directed to encoder 74, where three bits are taken from the stream as input and a four-bit coded output is produced and presented to the mapper 60. This process of activating and deactivating encoders 72, 74 is performed periodically in a manner so as to obtain the desired effective coding rates. With proper design, the effective coding rate achieved by the alternating or switching of encoders 72 and 74 can be modulated using a smaller signal constellation than if the same effective coding rate were implemented using a single encoder.

Figure 7:
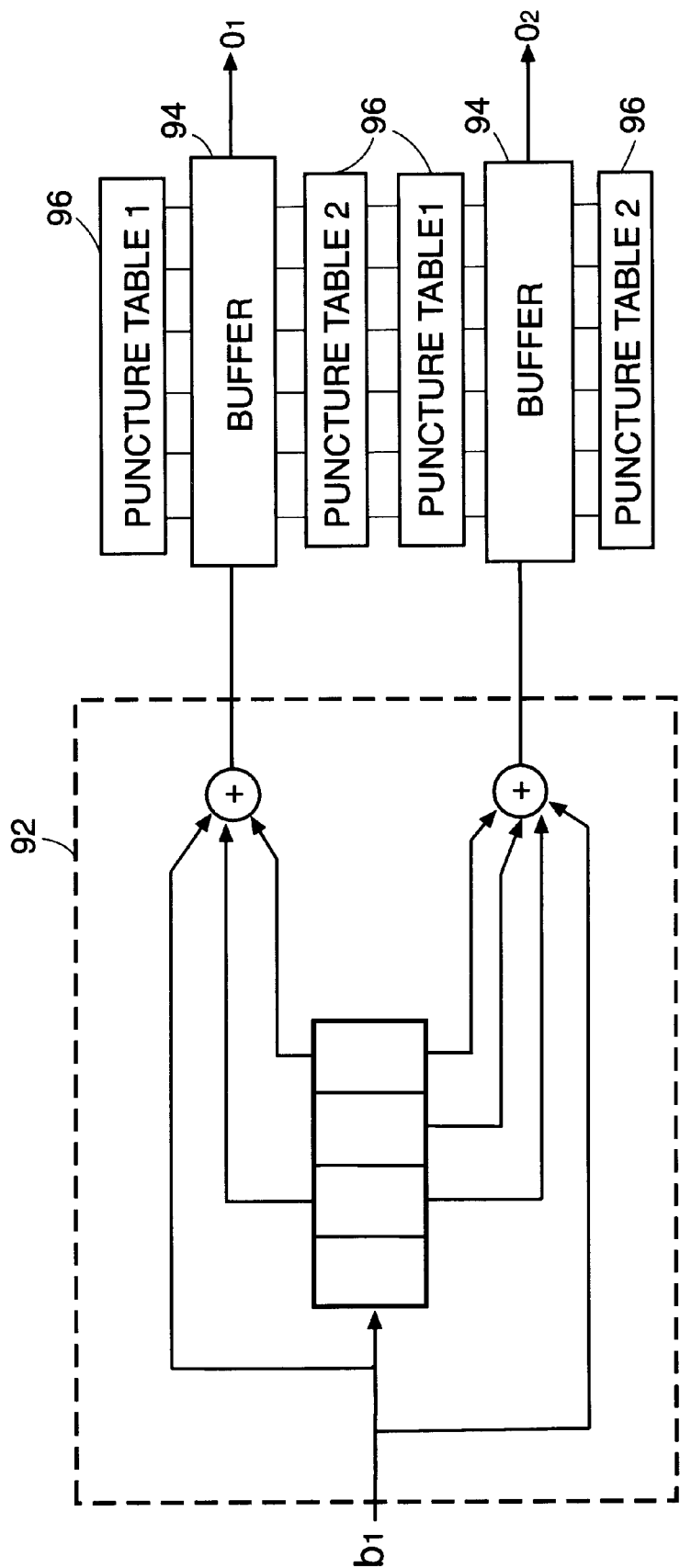
FIG. 7 is a block diagram illustrating an encoder that implements a puncturing method of encoding.

Referring now to FIG. 7, a trellis coder 90 is shown which implements the puncturing method of encoding in accordance with the present invention. Trellis coder 90 includes a convolutional encoder 92 and a pair of puncture buffers 94. The convolutional encoder 92 receives an input bit stream from a source encoder and produces an intermediate output comprising two bits. Thus, the encoder 92 provides an effective 1/2 coding rate. Each bit is routed to a respective puncture buffer 94 which temporarily holds the intermediate output of the convolutional encoder 92. Two different puncture patterns are stored in separate puncture pattern tables 96 and used at different times to puncture the intermediate output of the convolutional encoder 92.

In general, punctured convolutional encoders achieve higher-rate codes through periodic deletion of one or more bits from the intermediate output. Typically, bits are loaded into the puncture buffer 94 in a serial manner, with one bit entering the buffer per time interval. Thus, the time required to completely fill the puncture buffer, referred to herein as the puncture period, is directly proportional to the number of bits contained in the puncture buffer 94. At the end of every puncture period, the puncture pattern stored in the puncture pattern table 96 is applied to the contents of the puncture buffer 94, resulting in the deletion (or puncture) of specific bits from the buffer 94. The remaining contents of the puncture buffer 94 are then output.

The method of the present invention necessarily requires that the number of coded output bits that result from the puncturing process remain constant so as to facilitate the use of a constant signal constellation. This is achieved through careful selection of the puncture buffer period and the associated puncture patterns. For instance, if three coded output bits are required for use with an 8-PSK modulation scheme, a puncture buffer 94 possessing a puncture period of three could be utilized in combination with any viable puncture pattern which results in the deletion of three bits from a total of six bits. A puncture buffer 94 with a period of two could also be utilized, provided that it is used in conjunction with a viable puncture pattern which results in the deletion of one bit from a total of four bits.

In the contemplated embodiment, variable coding rates are achieved by periodically switching both the puncture period and the puncture table 96 which stores the puncture pattern. This switching of the puncture pattern results in two different coding rates. For example, by deleting three intermediate output bits from a total of six, the effective coding rate is 1/1. By deleting one intermediate output bit from a total of four, the effective coding rate is 2/3. These rates assume that a rate ½ convolutional encoder is used to produce the intermediate output.

Decoding is accomplished by aggregating the trellis structure of the convolutional encoder 92 over two or three trellis stages. By aggregating trellis stages together with different levels of aggregation (e.g. aggregating over two or three trellis stages), the resultant trellis is time-varying. For example, if the base trellis of the convolutional encoder 92 has two branches per state, puncturing and aggregating over two trellis stages results in four branches per state. Similarly, puncturing and aggregating over three trellis stages results in eight branches per state.

Figure 8:
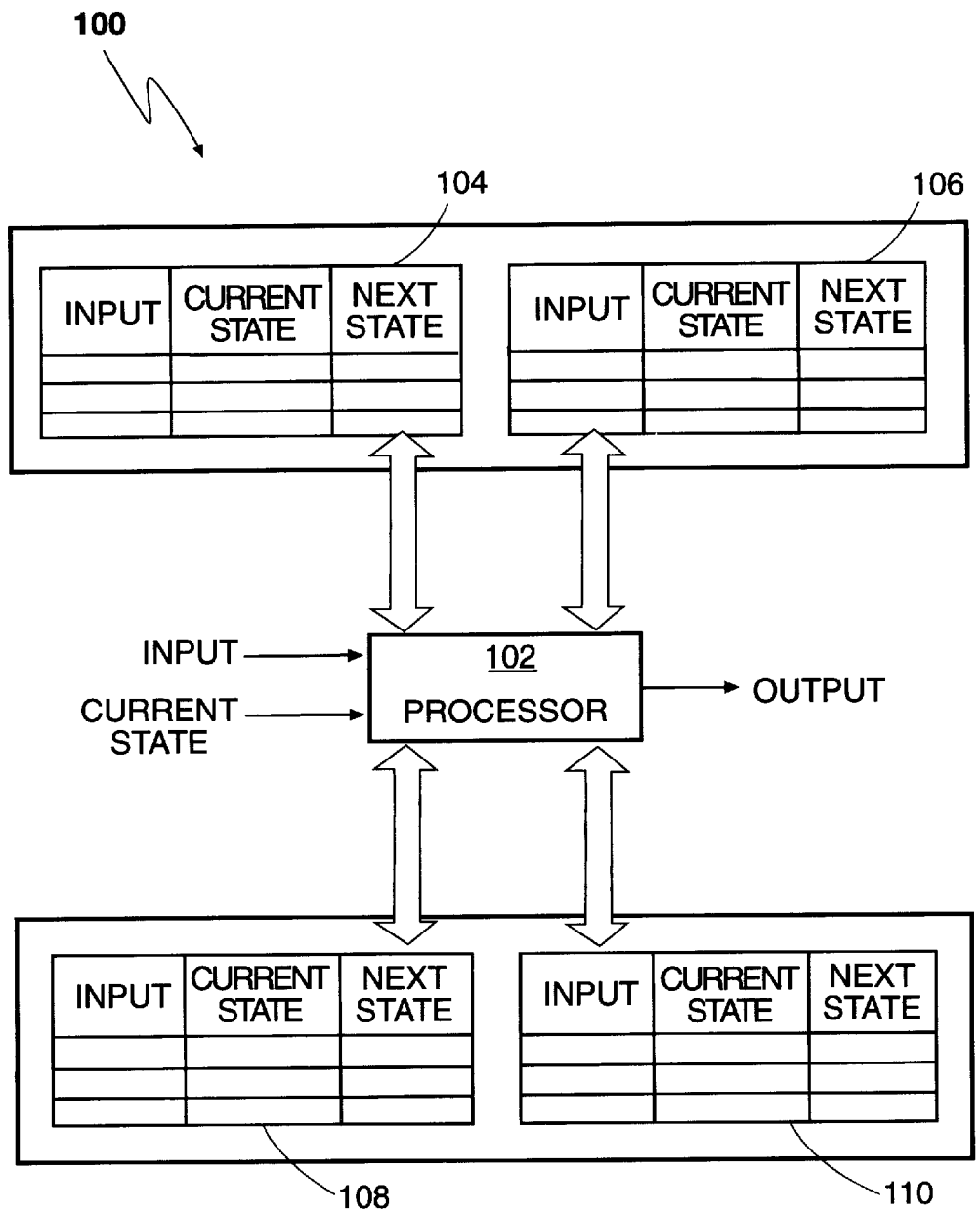
FIG. 8 is a block diagram of a software encoder that implements a look-up method of encoding.

FIG. 8 illustrates yet another implementation of the enhanced trellis coded modulation scheme implementing the look-up method in accordance with the present invention. In this embodiment, two encoders are stored as look-up tables in a non-volatile memory device. The encoder 100 comprises a processor 102 which receives an input stream from the source encoder 18. Connected to the processor 102 is a first look-up table 104 and a second look-up table 106. These tables 104 and 106 provide a tabular representation of the conventional coded trellis. The index fields of the look-up tables 104 and 106 are comprised of the input bits provided by the source encoder and the current state of the encoder 100. The output fields of tables 104 and 106 are comprised of the output bits and the next state of the encoder 100. Therefore, each record in the look-up tables 104 and 106 corresponds to a unique combination of the encoder's current state and input.

At any given time interval, the processor 102 determines which of the look-up tables 104, 106 is to be used. Based on the input from the source encoder 18 and current state of the encoder 100, the processor 102 "looks-up" the corresponding output and new state from the active table 104, 106. The selected output is passed to the mapper 60. The new state is used to update the state of the encoder 100. At periodic intervals of time, the look-up tables 104, 106 are switched to realize a time-varying trellis.

The time-varying trellis codes produced by any one of the three methods described can be decoded using a Viterbi decoder. The Viterbi algorithm is a maximum likelihood decoding algorithm for convolutional codes. As previously indicated, each sequence of valid code words generated by the encoder corresponds to a unique path through the trellis structure. The Viterbi algorithm operates one stage at a time over a finite number of trellis stages and attempts to find the trellis path corresponding to the transmitted code words. This corresponds to finding the path through the trellis structure.

To find the shortest path through the trellis structure, the decoder assigns to each branch of the trellis a numerical value called the branch metric. Then, for each path through the trellis, a path metric is assigned which is the sum of the branch metrics. The most likely path (a hence most likely code sequence) is the one with the lowest path metric. The Viterbi algorithm finds the path with the lowest path metric by sequentially moving through the trellis and at each stage, retaining one "survivor path" for each node of the trellis which has the lowest path metric,. When the final stage of the trellis is reached, the decoder determines which of the final "survivor paths" is optimum and outputs the corresponding bits. A more detailed explanation of the Viterbi algorithm, which is well known to those skilled in the art, can be found in Proakis, Digital Communications published by McGraw Hill.

Figure 9:
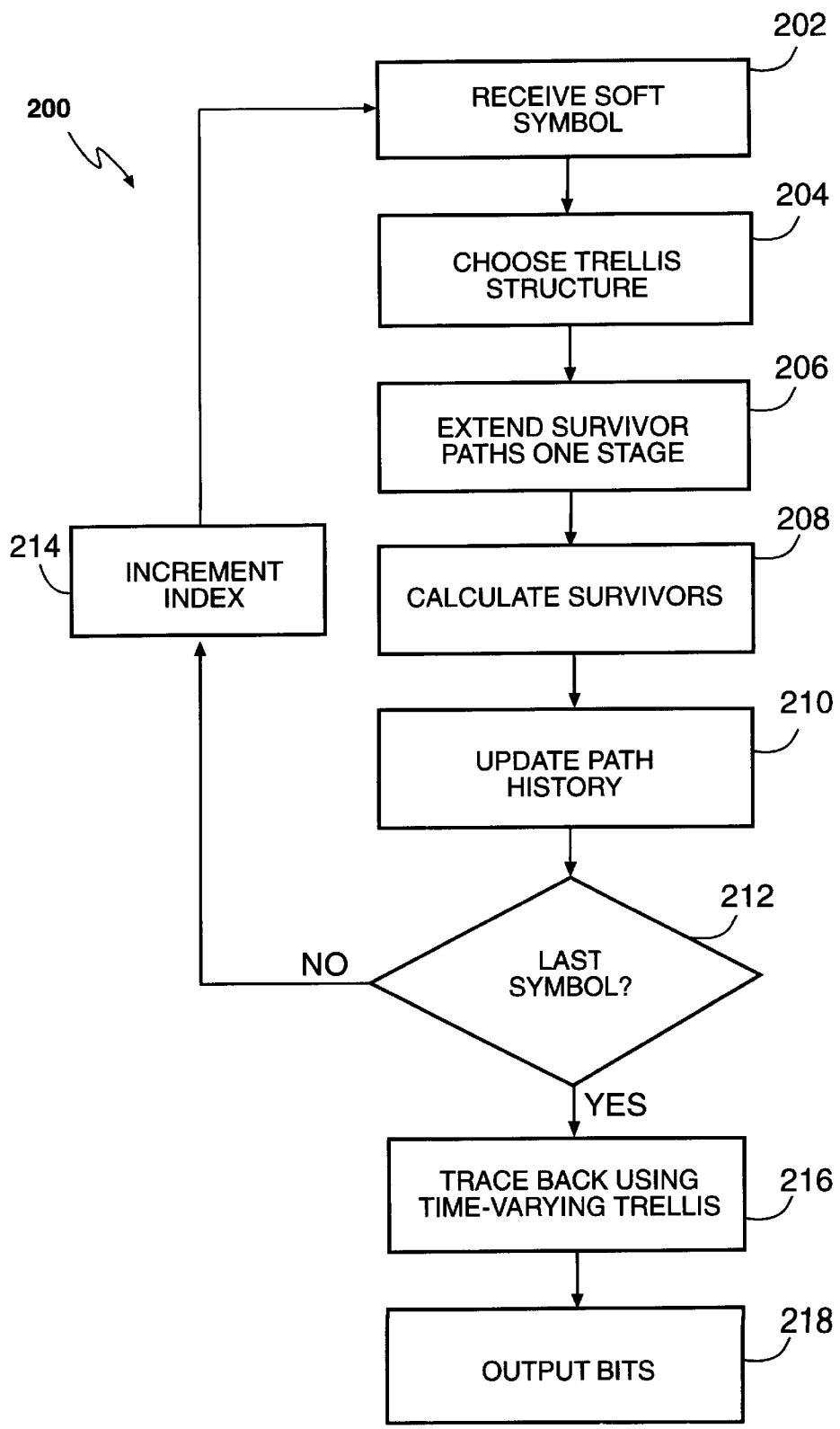
FIG. 9 is a flow diagram illustrating a method for decoding the time-varying trellis codes of the present invention.

Referring now to FIG. 9, a flow diagram is shown illustrating a method for decoding the time-varying trellis codes of the present invention. An input to the decoder is received (block 202). After receiving an input, the decoder must choose between the two or more available trellis structures based upon the current coding interval or stage (block 204). After choosing the appropriate trellis structure, the decoder extends all survivor paths by one stage, computes the branch metrics for the extended path segments (block 206) and determines the survivor paths for each state in the next stage (block 208). The decoder then updates the path history (block 210). The decoder then determines whether the terminal stage of the trellis has been reached (block 212). If not, the index indicating the current trellis stage or coding interval is incremented, (block 214) and the next input is received (block 202). This process repeats until the final trellis stage is reached. The decoder then traces back through the trellis along the sole surviving path to determine the code sequence which corresponds to a single transmitted sequence (block 216). During the trace back procedure, the decoder must keep track of which trellis stage it is at and select the corresponding trellis structure at each stage. The transmitted sequence corresponding to the surviving path is output from the decoder (block 208).

From the foregoing, it is apparent that a number of different effective coding rates can be obtained by periodically switching between two or more encoders which produce, at their output, the correct number of bits to directly map to the desired signal constellation. The resulting time-varying trellis code can be decoded using a conventional Viterbi algorithm. The encoding method of the present invention allows greater freedom in selecting code rates and matching it to a desired signal constellation.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An apparatus for encoding an input data stream comprising:

a. a convolutional encoder for coding said input data stream at a first selected code rate to generate a plurality of separate intermediate coded output streams; and b. a plurality of puncture buffers for puncturing each of said intermediate coded output streams to generate a final coded output, wherein each of the puncture buffers varies the puncture period and puncture pattern periodically while the total number of output bits generated from all of the plurality of puncture buffers during any given puncture period remains constant.

2. The encoding apparatus of claim 1 further including a mapper for mapping the coded output of said puncture buffers onto a signal constellation.

3. A method of encoding an input data stream comprising the steps of:

a. coding the input stream through a convolutional encoder producing at least two intermediate output streams;

b. providing a separate puncture buffer for each of the intermediate output streams, each of the puncture buffers having at least first and second puncture tables;

c. filling each of the puncture buffers from the at least two intermediate output streams;

d. puncturing each of the puncture buffers according to the first puncture table deleting at least one of the bits from each puncture buffer;

e. outputting a first output of remaining bits from each of the puncture buffers;

f. refilling each of the puncture buffers from the at least two intermediate output streams; and g. puncturing each of the puncture buffers according to the second puncture table deleting at least one of the bits from each puncture buffer and outputting a second output, wherein the first and second outputs are constant.

4. The method of claim 3, wherein the input stream is received at the convolutional encoder from a source encoder.

5. The method of claim 3, further including mapping the first and second outputs to a signal constellation.

6. The method of claim 3, wherein the first and second outputs are created using varying puncture puncture periods and puncture patterns.

* * * * *